(12) United States Patent
Miyake

(10) Patent No.: US 12,722,230 B2
(45) Date of Patent: Sep. 1, 2026

(54) SCALE, ENCODER AND MANUFACTURING METHOD OF SCALE

(71) Applicant: MITUTOYO CORPORATION, Kawasaki (JP)

(72) Inventor: Kosaku Miyake, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 161 days.

(21) Appl. No.: 18/669,693

(22) Filed: May 21, 2024

(65) Prior Publication Data

US 2024/0399505 A1 Dec. 5, 2024

(30) Foreign Application Priority Data

Jun. 5, 2023 (JP) ................................ 2023-092693

(51) Int. Cl.
*G01D 5/20* (2006.01)
*B23K 26/362* (2014.01)

(52) U.S. Cl.
CPC ............ *B23K 26/362* (2013.01); *G01D 5/20* (2013.01)

(58) Field of Classification Search
CPC ............ B60W 2420/506; G06K 7/082; H05K 2201/086; Y10S 336/00; Y10S 505/87
See application file for complete search history.

(56) References Cited

U.S. PATENT DOCUMENTS

| | | | |
|---|---|---|---|
| 5,543,228 A | 8/1996 | Taniguchi et al. | |
| 7,663,607 B2 * | 2/2010 | Hotelling | G06F 3/04166 345/173 |
| 8,598,509 B2 * | 12/2013 | Batchelder | G01D 5/34715 356/616 |
| 9,612,674 B2 * | 4/2017 | Degner | G06F 3/042 |
| 2007/0240325 A1 | 10/2007 | Pelsue et al. | |
| 2023/0182232 A1 | 6/2023 | Miyake | |

FOREIGN PATENT DOCUMENTS

| | | |
|---|---|---|
| JP | 06-201906 A | 7/1994 |
| JP | 07-237934 A | 9/1995 |
| JP | 2008-235679 A | 10/2008 |
| JP | 2009-511276 A | 3/2009 |
| JP | 2023-086535 A | 6/2023 |

* cited by examiner

*Primary Examiner* — Tung X Nguyen
(74) *Attorney, Agent, or Firm* — Rankin, Hill & Clark LLP

(57) ABSTRACT

A scale includes a glass substrate having a frosted glass-like upper surface, a plurality of conductor patterns arranged at predetermined intervals on the upper surface of the glass substrate, and a formation provided on a lower surface of the glass substrate.

18 Claims, 14 Drawing Sheets

1000

50
TRANS-
MISSION
SIGNAL
GENERATOR
10
11
100
44
42
40
20
20
20
RECEIVER COIL
λ
Y
Z
X
DISPLACEMENT
AMOUNT
MEASURER
60

OUTPUT VOLTAGE
λ
DISPLACEMENT
AMOUNT 44
42
Y
Z
X 11
10
12

Z
Y
X
11
10
12

Z
Y
X
22
11
10
12
30

Z
Y
X
14
13
70
20
11
10
12
30
Z
Y
X

FIG. 4A
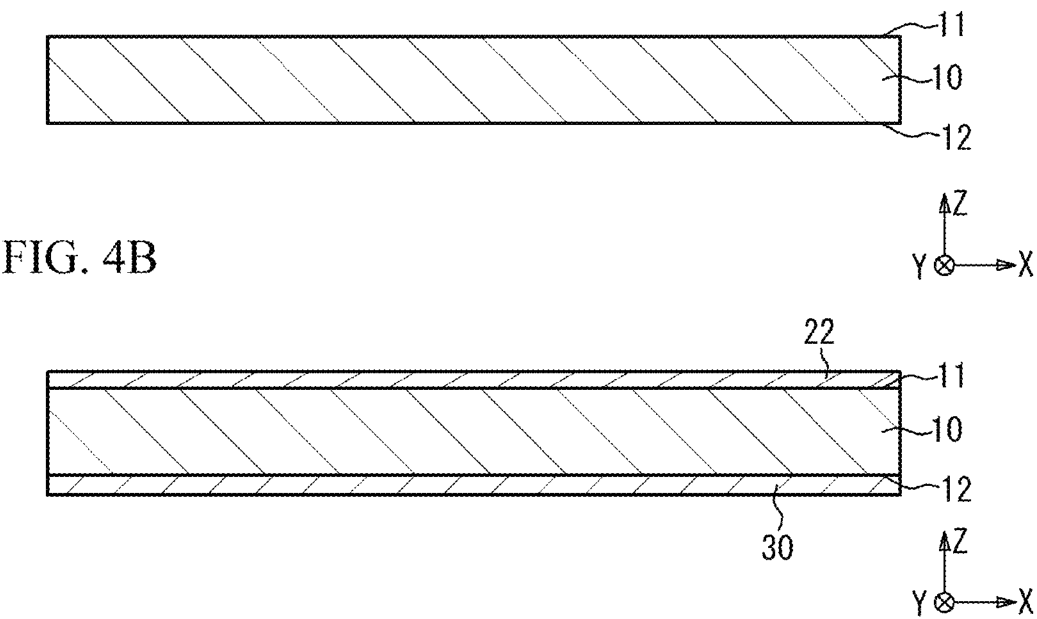
FIG. 4B
FIG. 4C
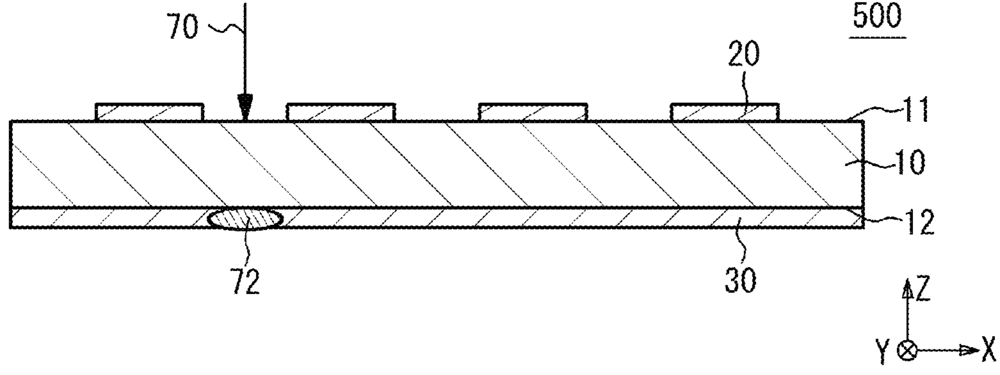

11
10
12
Z
Y
X 11
10
12
Z
Y
X 22
80
11
10
12
82
30
Z
Y
X 14
13
70
20
80
11
10
12
82
30
Z
Y
X 11
10
12
Z
Y
X 11
10
12
Z
Y
X 24
11
10
12
30
Z
Y
X 14
13
70
16
15
20
11
10
12
30
Z
Y
X

SAMPLE A
10
100 μm

SAMPLE B
10
100 μm

SAMPLE C
10
100 μm

SAMPLE D
10
100 μm

SCALE, ENCODER AND MANUFACTURING METHOD OF SCALE

CROSS-REFERENCE TO RELATED APPLICATION

This application is based upon and claims the benefit of priority of the prior Japanese Patent Application No. 2023-092693 filed on Jun. 5, 2023, the entire contents of which are incorporated herein by reference.

FIELD

A certain aspect of embodiments described herein relates to a scale, an encoder and a manufacturing method of the scale.

BACKGROUND

As a scale used in encoders or the like, there is known a scale in which a resin layer is provided on a glass substrate, and has mirror-surfaced concave portions and rough-surfaced convex portions repeatedly, and a silicon oxide layer, an aluminum layer, and a silicon oxide layer are sequentially provided on the convex portions (see, for example, Japanese Patent Laid-Open No. 6-201906). In addition, by dissolving ammonium sulfate, ammonium chloride, and ammonium nitrate alone or in combination in hydrofluoric acid, and treating the glass surface with a solution in which sulfuric acid, hydrochloric acid, and nitric acid are added alone or in combination as necessary, the glass surface can be treated. In this case, it is known that fine irregularities are formed on the surface (see, for example, Japanese Patent Application Laid-Open No. 7-237934).

SUMMARY

In one aspect, the present invention aims to make it difficult for formations such as films and elements provided on the lower surface of a glass substrate to be damaged.

According to an aspect of the present invention, there is provided a scale including: a glass substrate having a frosted glass-like upper surface; a plurality of conductor patterns arranged at predetermined intervals on the upper surface of the glass substrate; and a formation provided on a lower surface of the glass substrate.

According to another aspect of the present invention, there is provided an encoder including: the scale as mentioned above.

According to another aspect of the present invention, there is provided a manufacturing method of a scale including: roughening an upper surface of a glass substrate into a frosted glass state; forming a formation on a lower surface of the glass substrate; and after roughening the upper surface of the glass substrate into the frosted glass state and forming the formation, forming a plurality of conductor patterns arranged at predetermined intervals on the upper surface of the glass substrate by laser processing.

BRIEF DESCRIPTION OF DRAWINGS

FIG. 4A to FIG. 4C are cross-sectional views illustrating a method for manufacturing a scale according to Comparative Example 1;

FIG. 8A to FIG. 8C are cross-sectional views illustrating a method for manufacturing a scale according to Comparative Example 2;

FIG. 14A and FIG. 14B are examples of optical microscope images of an upper surface and a lower surface of device B manufactured using glass substrates of samples A and D.

DESCRIPTION OF EMBODIMENTS

By forming a conductor pattern for the scale on the upper surface of the glass substrate using laser processing, it is possible to shorten the processing time when forming the conductor pattern and/or improve the processing reproducibility of the conductor pattern. When the conductor pattern is formed on the upper surface of the glass substrate, there is a reason to suppress the occurrence of warpage on the glass substrate. And in the case of an electromagnetic induction encoder scale, a conductor film may be provided on the lower surface of the glass substrate as an electromagnetic shield for suppressing noise caused by non-uniformity of members below the mounting surface of the encoder device. Further, a scale having reference points and elements constituting a circuit may be formed on the lower surface of the glass substrate. In this case, when forming the conductor pattern on the upper surface of a glass substrate using laser processing, the formed objects such as films and elements on the lower surface of the glass substrate may be damaged by the laser that penetrates during processing and defects may occur on the lower surface of the scale.

Hereinafter, embodiments will be described with reference to the drawings.

Figure 1A:
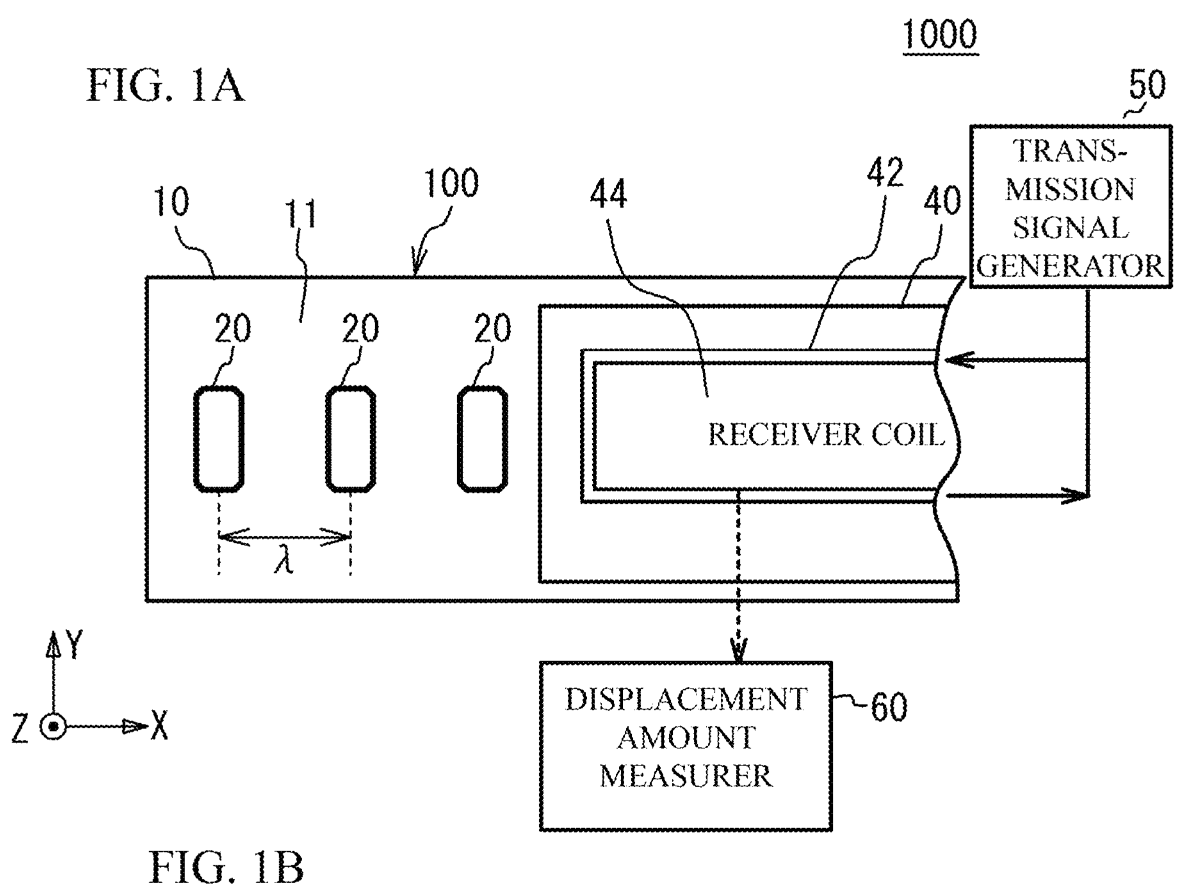
FIG. 1A is a diagram illustrating a configuration of an electromagnetic induction encoder including a scale according to a first embodiment.

(First Embodiment) FIG. 1A is a diagram illustrating a configuration of an electromagnetic induction encoder 1000 including a scale 100 according to a first embodiment. As illustrated in FIG. 1A, the electromagnetic induction encoder 1000 includes the scale 100 and a detection head 40 that moves relatively in the measurement axis direction with respect to the scale 100. The scale 100 and the detection head 40 each have a substantially flat plate shape, and are disposed facing each other with a predetermined gap interposed therebetween. The electromagnetic induction encoder 1000 also includes a transmission signal generator 50, a displacement measurer 60, and the like. In FIG. 1A, the X-axis represents the displacement direction (measurement axis) of the detection head 40. In the plane formed by the scale 100, the direction perpendicular to the X-axis is defined as the Y-axis. The direction perpendicular to the plane constituting the scale 100 is defined as the Z axis.

The detection head 40 is provided with a transmitter coil 42, a receiver coil 44, and the like. The transmitter coil 42 constitutes a rectangular coil whose length direction is in the X-axis direction. The receiver coil 44 is arranged inside the transmitter coil 42.

In the scale 100, a plurality of conductor patterns 20 made of a conductor are provided on an upper surface 11 of a glass substrate 10. The plurality of conductor patterns 20 are arranged along the X-axis direction at a fundamental period λ. The basic period λ corresponds to the distance between the centers of two of the adjacent conductor patterns 20 in the X-axis direction. The conductor pattern 20 is, for example, a plate-like pattern without holes or a closed loop coil. The conductor pattern 20 is electromagnetically coupled to the transmitter coil 42 and also electromagnetically coupled to the receiver coil 44.

Figure 1B:
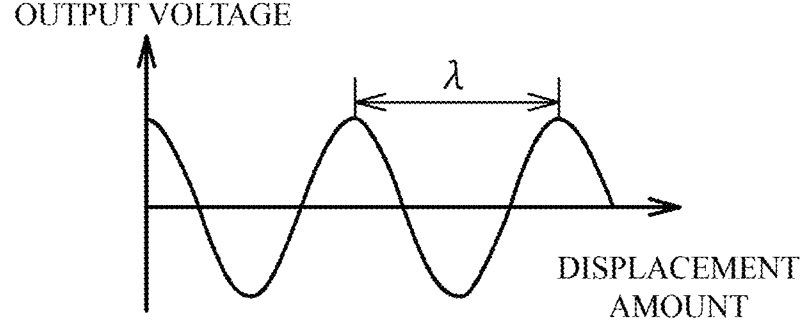
FIG. 1B is a diagram illustrating a detected sine wave signal.

The transmission signal generator 50 generates a single-phase AC transmission signal and supplies the signal to the transmitter coil 42. In this case, magnetic flux is generated in the transmitter coil 42. As a result, an electromotive current is generated in the plurality of conductor patterns 20. The plurality of conductor patterns 20 are electromagnetically coupled to the magnetic flux generated by the transmitter coil 42, thereby generating magnetic flux that changes at a predetermined spatial period in the X-axis direction. The magnetic flux generated by the conductor pattern 20 causes an electromotive current to be generated in the receiver coil 44. The electromagnetic coupling between the conductor pattern 20 and the receiver coil 44 changes depending on the amount of displacement of the detection head 40. Thereby, as illustrated in FIG. 1B, a sine wave signal having the same period as the fundamental period λ is obtained. Therefore, the receiver coil 44 detects the phase of the magnetic flux generated by the plurality of conductor patterns 20.

The displacement measurer 60 can electrically interpolate this sine wave signal to use the signal as a digital quantity with minimum resolution, and measures the displacement of the detection head 40. Note that in FIG. 1B, the horizontal axis represents the displacement amount of the detection head 40, and the vertical axis represents the output voltage of the receiver coil 44.

The transmitter coil 42, the receiver coil 44, and the conductor patterns 20 that are electromagnetically coupled to each other constitute one track. Therefore, in this embodiment, the electromagnetic induction encoder 1000 includes one track. Note that the electromagnetic induction encoder 1000 may have two tracks arranged at a predetermined interval in the Y-axis direction. In this case, the fundamental period λ may be different between the two tracks. This allows it to function as an absolute (ABS) type encoder.

Figure 1C:
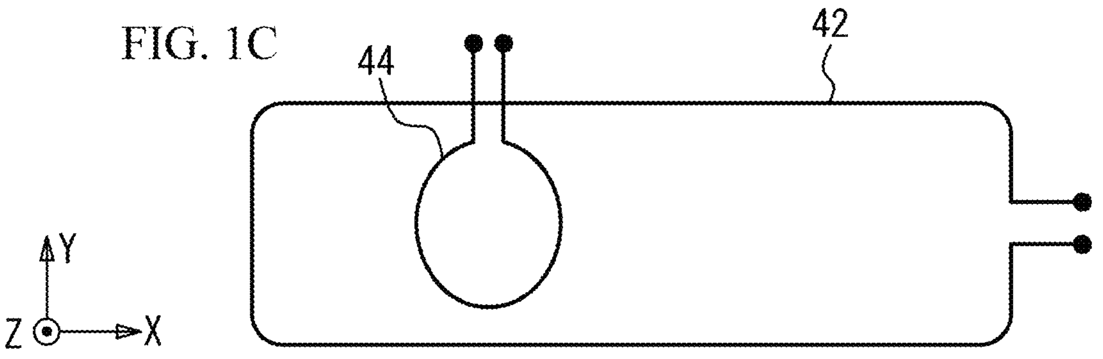
FIG. 1C is a diagram illustrating a transmitter coil and a receiver coil.

FIG. 1C is a diagram illustrating the transmitter coil 42 and the receiver coil 44 provided in the detection head 40. As illustrated in FIG. 1C, the receiver coil 44 is arranged inside the transmitter coil 42 forming a rectangular coil. The receiver coil 44 is, for example, a circular coil, but may have other configurations.

Figure 2A:
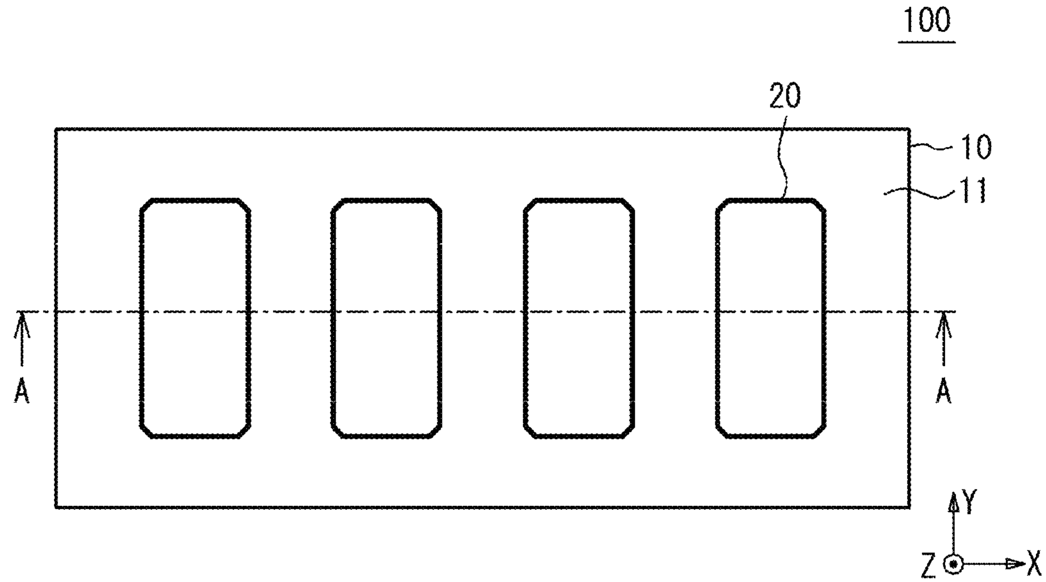
FIG. 2A is a plan view illustrating a scale according to a first embodiment.
Figure 2B:
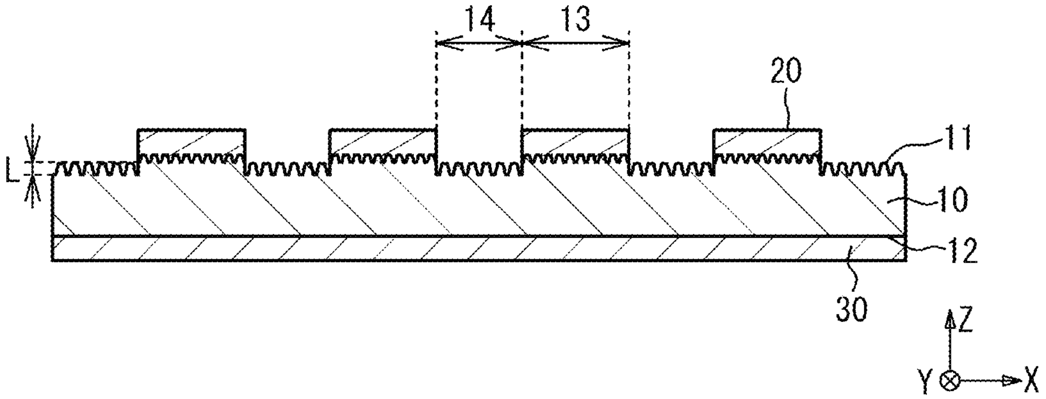
FIG. 2B is a cross-sectional view taken along a line A-A in FIG. 2A.

FIG. 2A is a plan view illustrating the scale 100 according to the first embodiment, and FIG. 2B is a cross sectional view taken along the line A-A in FIG. 2A. As illustrated in FIG. 2A and FIG. 2B, the scale 100 includes a plurality of conductor patterns 20 provided on the upper surface 11 of the glass substrate 10, and a conductor film 30 provided on a lower surface 12 of the glass substrate 10, for example. The plurality of conductor patterns 20 are arranged at predetermined intervals along the X-axis direction. The plurality of conductor patterns 20 have a substantially rectangular shape with the Y-axis direction being the longitudinal direction when viewed from the +Z direction.

The glass substrate 10 is formed of, for example, quartz glass, soda lime glass, or alkali-free glass, but may be made of other materials. Quartz glass is a glass made mostly of silicon dioxide ($SiO_2$) and has very few impurities. Soda lime glass is a glass whose main component is silicon dioxide ($SiO_2$) and further contains sodium oxide ($Na_2O$) and calcium oxide (CaO). Alkali-free glass is a glass whose main component is silicon dioxide ($SiO_2$) and which does not contain alkaline components such as sodium and potassium. The thickness of the glass substrate 10 is, for example, about 0.5 mm to 5.0 mm.

The conductor pattern 20 is formed of a conductor such as copper, silver, gold, or aluminum. The thickness of the conductor pattern 20 is, for example, about 5 μm to 30 μm. The width of the conductor pattern 20 is, for example, about 500 μm to 3000 μm. The interval between the conductor patterns 20 is also about 500 μm to 3000 μm, for example.

The conductor film 30 is made of a conductor such as copper, silver, gold, or aluminum. The conductor film 30 is made of the same material as the conductor pattern 20, for example. The thickness of the conductor film 30 is, for example, 5 μm to 30 μm. The thickness of the conductor film 30 is, for example, approximately the same as the thickness of the conductor pattern 20, and is 0.8 times or more and 1.2 times or less, and 0.9 times or more and 1.1 times the thickness of the conductor pattern 20.

The upper surface 11 of the glass substrate 10 is frosted and opaque, and has fine irregularities formed therein. The upper surface 11 has a first region 13 provided with the conductor patterns 20 and a second region 14 located between the adjacent conductor patterns 20. The arithmetic mean roughness of the upper surface 11 is 0.20 μm or more in both the first region 13 and the second region 14. Therefore, the upper surface 11 is in an opaque state in both the first region 13 and the second region 14. The surface roughness of the upper surface 11 in the second region 14 is approximately the same as that in the first region 13, or is increased due to damage caused by processing. Further, the second region 14 may be colored due to damage caused by processing. The lower surface 12 of the glass substrate 10 is a substantially smooth surface. The arithmetic mean roughness Ra of the lower surface 12 is, for example, 0.01 μm or less.

Because the upper surface 11 of the glass substrate 10 is frosted glass, the transmittance of light incident on the upper surface 11 is poor. For example, when red light (wavelength: 630 nm to 670 nm) is vertically and directly incident on the first region 13 of the upper surface 11 in a state where the conductor pattern 20 and the conductor film 30 are not provided, the transmittance of the red light from the upper surface 11 to the lower surface 12 is 90% or less, may be 87% or less, or may be 85% or less. Even when red light is vertically and directly incident on the second region 14 of the upper surface 11, the transmittance of the red light from the upper surface 11 to the lower surface 12 is 90% or less, may be 87% or less, or may be 85% or less. Transmittance is the ratio of the intensity of light emitted from the lower surface 12 to the intensity of light incident on the upper surface 11.

The upper surface 11 of the glass substrate 10 has a shape in which the second region 14 is recessed in the −Z direction with respect to the first region 13. The second region 14 is formed deeper than the conductor pattern 20 at the boundary with the first region 13. That is, the bottom of the second region 14 at the boundary with the first region 13 is located closer to the lower surface 12 of the glass substrate 10 than the conductor pattern 20 is.

Figures 3A, 3B, 3C, 3D:
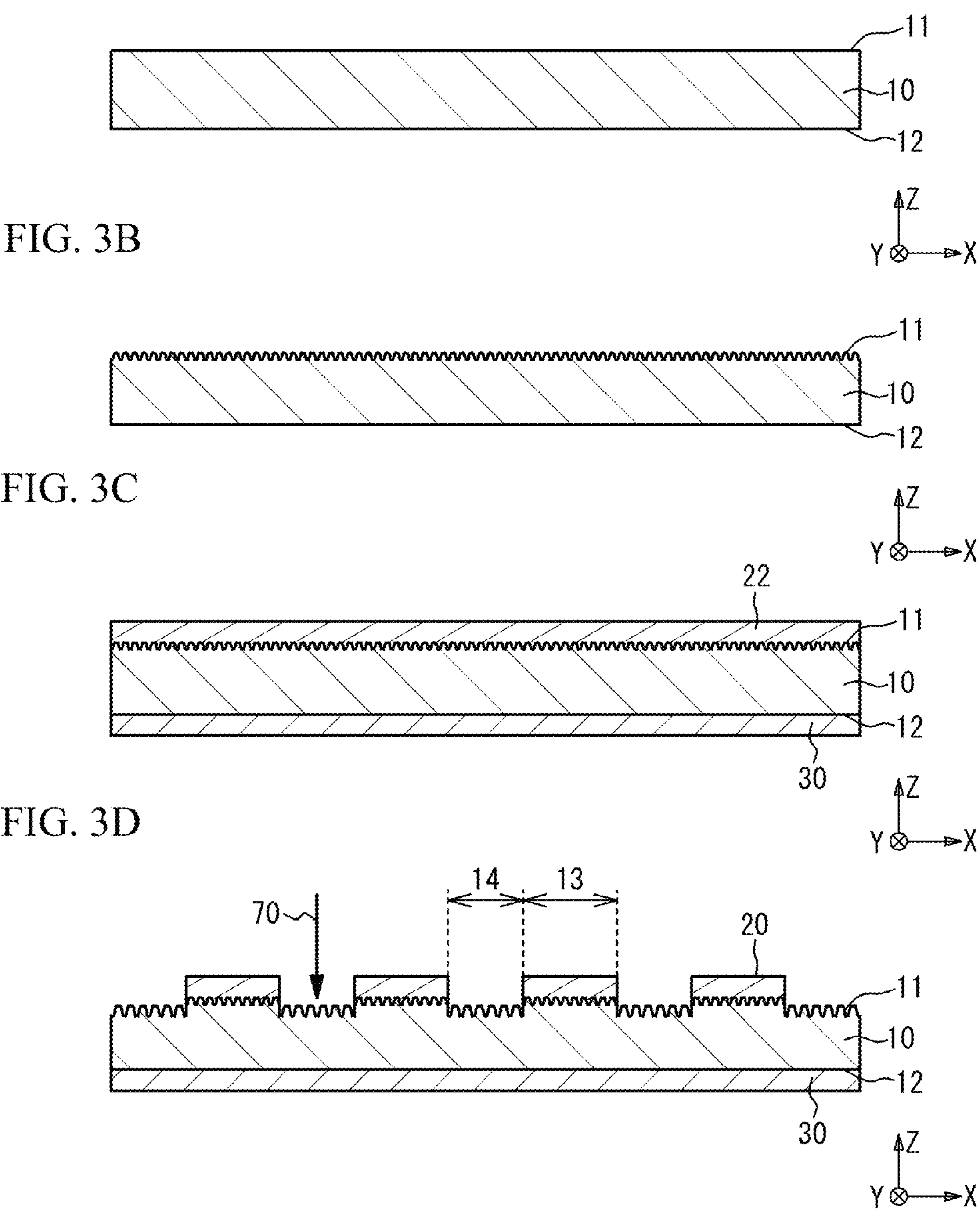
FIG. 3A to FIG. 3D are cross-sectional views illustrating a scale manufacturing method according to a first embodiment.

[Manufacturing Method] FIG. 3A to FIG. 3D are cross-sectional views illustrating a method for manufacturing the scale 100 according to the first embodiment. As illustrated in FIG. 3A, first, the glass substrate 10 is prepared. At this stage, both the upper surface 11 and the lower surface 12 of the glass substrate 10 are smooth surfaces, and the arithmetic mean roughness Ra is, for example, 0.01 μm or less.

As illustrated in FIG. 3B, the upper surface 11 of the glass substrate 10 is roughened to form a frosted glass-like surface having fine irregularities. For example, the upper surface 11 is roughened by blasting or chemical treatment using hydrofluoric acid or the like to make the upper surface 11 look like frosted glass. By forming the upper surface 11 into a frosted glass shape, light incident on the upper surface 11 is diffusely reflected on the upper surface 11. Therefore, the transmittance of light incident on the upper surface 11 from the upper surface 11 to the lower surface 12 decreases. For example, the upper surface 11 is roughened so that the arithmetic mean roughness Ra is 0.20 μm or more to form a frosted glass shape.

As illustrated in FIG. 3C, a conductor film 22 is formed on the upper surface 11 of the glass substrate 10, and the conductor film 30 is formed on the lower surface 12. The conductor film 22 and the conductor film 30 are formed using, for example, an electroless plating method. Note that the conductor film 22 and the conductor film 30 may be formed by forming a base conductor layer and then forming a conductor film on the base conductor layer using an electrolytic plating method. It is preferable that the conductor film 22 and the conductor film 30 are formed (film-formed) at the same time. In this case, the conductor film 22 and the conductor film 30 are formed of the same material and have approximately the same thickness.

As illustrated in FIG. 3D, the conductor film 22 is patterned by laser processing using a laser beam 70 to form the plurality of conductor patterns 20. The laser processing is performed by pulsed laser processing using, for example, infrared (for example, wavelength 1032 nm), green (for example, wavelength 532 nm), or ultraviolet (for example, wavelength 355 nm) laser light 70. In the pulsed laser processing, for example, a pulsed laser having a pulse width on the order of femtoseconds to picoseconds and an energy density of 0.1 to 10 J/cm$^2$ is used. By repeating linear irradiation with a short pulse laser at a high speed of 10 kHz to 5 MHZ, the side surface of the conductor pattern 20 can be made into a flat tapered surface with an angle of about 60° to 80°.

Because the upper surface 11 of the glass substrate 10 is roughened and has a frosted glass shape, the laser beam 70 is diffusely reflected on the upper surface 11 and energy is absorbed on the upper surface 11. Therefore, when etching the conductor film 22 with the laser beam 70 to form the conductor pattern 20, the second region 14 located between the adjacent conductor patterns 20 on the upper surface 11 of the glass substrate 10 is etched with the laser beam 70. When the etching depth reaches the upper surface 11, the surface roughness remains high. Therefore, the laser beam 70 continues to be diffusely reflected on the upper surface 11, and the laser beam 70 is prevented from transmitting from the upper surface 11 to the lower surface 12 and damaging the conductor film 30 provided on the lower surface 12.

Further, processing conditions may be selected such that the upper surface 11 in the second region 14 is colored from opaque to black by being irradiated with the laser light 70. The processing conditions include a combination of conditions such as laser intensity, pulse frequency, spot diameter, spot interval, depth of focus, processing trajectory, and irradiation timing. If the upper surface 11 of the glass substrate 10 is not frosted, the laser beam 70 is irradiated with the smooth upper surface 11 of the glass substrate 10 exposed by etching the conductor film 22, so that the laser beam 70 may penetrate the glass substrate 10. However, by roughening the upper surface 11 of the glass substrate 10 in advance to make the upper surface 11 frosted, even if the upper surface 11 of the glass substrate 10 is exposed during etching with the laser beam 70, the upper surface 11 will remain frosted. Therefore, the laser light 70 is prevented from penetrating the glass substrate 10.

Further, the upper surface 11 of the glass substrate 10 is etched by being irradiated with the laser beam 70, so that the second region 14 is recessed more than the first region 13. That is, the upper surface 11 becomes a recessed portion in which the second region 14 is recessed relative to the first region 13. The inner surface of this recess is a rough surface including coloring and unevenness, and may have a tapered shape so as to totally reflect the laser beam 70. For example, the angle between the bottom surface and the inner surface of the recess may be 30 degrees or less. A periodic nano-sized uneven pattern (Laser-induced periodical surface structure: LIPSS) having the same wavelength as the laser beam 70 may be formed on the bottom surface of the recess or the tapered surface including the conductor pattern 20. This uneven pattern is unintentionally formed and is not used as part of the scale. Further, since the uneven pattern is nano-sized, the influence on length measurement using the scale 100 can be suppressed.

[Comparative Example 1] FIG. 4A to FIG. 4C are cross-sectional views illustrating a method for manufacturing a scale 500 according to a comparative example 1. The glass substrate 10 is prepared as illustrated in FIG. 4A. Both the upper surface 11 and lower surface 12 of the glass substrate 10 are smooth surfaces. As illustrated in FIG. 4B, the conductor film 22 is formed on the upper surface 11 of the glass substrate 10 without roughening the upper surface 11 of the glass substrate 10 to make the upper surface 11 frosted, and the conductor film 30 is formed on the lower surface 12.

As illustrated in FIG. 4C, the conductor film 22 is patterned by laser processing using the laser beam 70 to form the plurality of conductor patterns 20. Since the upper surface 11 of the glass substrate 10 is not roughened and is a smooth surface, the laser beam 70 is unlikely to be diffusely reflected by the upper surface 11. Therefore, the laser beam 70 is easily transmitted from the upper surface 11 to the lower surface 12. For example, the transmittance may be greater than 90% in a portion of the second region 14. The laser beam 70 transmitted from the upper surface 11 to the lower surface 12 of the glass substrate 10 may cause damage such as a burnt spot 72 to the conductor film 30 provided on the lower surface 12. If the burnt spot 72 is formed protruding from the lower surface of the conductor film 30, the posture of the glass substrate 10 will change during subsequent patterning of the conductor film 22, and the focus of the laser beam 70 will shift, making it impossible to perform patterning normally. Further, when the scale 500 is mounted on a flat mounting surface of an encoder device using an adhesive or the like, the scale 500 may become tilted and cannot be used as a scale. Furthermore, the scale 500 may be easily peeled off from the mounting surface of the encoder device.

On the other hand, in the first embodiment, as illustrated in FIG. 3B, the upper surface 11 of the glass substrate 10 is roughened to have a frosted glass shape. Therefore, even when the plurality of conductor patterns 20 are formed on the upper surface 11 of the glass substrate 10 by laser processing using the laser beam 70 as illustrated in FIG. 3D, the laser beam 70 is diffusely reflected on the upper surface 11. Therefore, the influence of the laser beam 70 on the conductor film 30 formed on the lower surface 12 can be suppressed. Therefore, damage to the conductor film 30 can be suppressed.

As described above, according to the first embodiment, the glass substrate 10 has the frosted glass-like upper surface 11. Thereby, as described above, even when the conductor pattern 20 is formed by laser processing, the conductor film 30 (formed product) provided on the lower surface 12 of the glass substrate 10 is less likely to be damaged. Further, since the conductor pattern 20 is provided on the frosted glass-like upper surface 11, the bonding area between the upper surface 11 and the conductor pattern 20 becomes large, and the bonding strength of the conductor pattern 20 is improved.

Further, in the first embodiment, as illustrated in FIG. 3D, the conductor film 22 formed on the upper surface 11 of the glass substrate 10 is patterned by laser processing using the laser beam 70 to form the conductor pattern 20. Therefore, the upper surface 11 of the glass substrate 10 is also etched by the laser beam 70. As a result, the second region 14 of the upper surface 11 of the glass substrate 10 is recessed with respect to the first region 13, and is formed deeper than the conductor pattern 20 at the boundary with the first region 13. This suppresses the occurrence of hem residue at the lower end of the conductor pattern 20 after the conductor pattern 20 is formed. Therefore, disturbances in the current flowing through the conductor pattern 20 are suppressed. From the viewpoint of suppressing disturbances in the current flowing through the conductor pattern 20, the distance L between the bottom of the second region 14 and the conductor pattern 20 at the boundary with the first region 13 (see FIG. 2B) is preferably set to 1 μm or more, more preferably 3 μm or more, and even more preferably 5 μm or more. On the other hand, from the viewpoint of shortening processing time, the distance L is preferably 10 μm or less, more preferably 8 μm or less, and even more preferably 6 μm or less. Further, since the upper surface 11 of the glass substrate 10 is etched by the laser beam 70, the surface roughness of the second region 14 may be greater than that of the first region 13.

Further, in the first embodiment, after forming the conductor film 22 on the upper surface 11 of the glass substrate 10 and forming the conductor film 30 on the lower surface 12, the conductor film 22 is patterned using laser processing to form the plurality of conductor patterns 20. Since both the conductor film 22 and the conductor film 30 are formed, warping of the glass substrate 10 is suppressed, so that the conductor film 22 can be patterned well using laser processing. Further, for example, if the conductor film 22 is formed only on the upper surface 11 and the conductor film 22 is patterned to form the plurality of conductor patterns 20 and then the conductor film 30 is formed on the lower surface 12, the number of manufacturing steps and so on will increase. On the other hand, by forming the conductor film 22 and the conductor film 30 at the same time and then patterning the conductor film 22 to form the plurality of conductor patterns 20, it is possible to suppress an increase in the number of manufacturing steps.

Figure 5A:
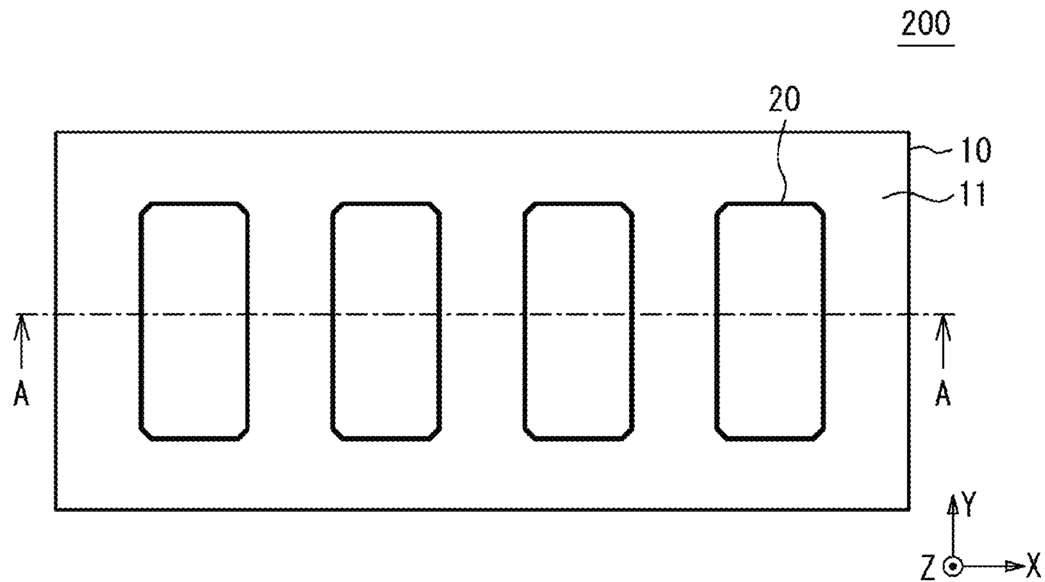
FIG. 5A is a plan view illustrating a scale according to a second embodiment.
Figure 5B:
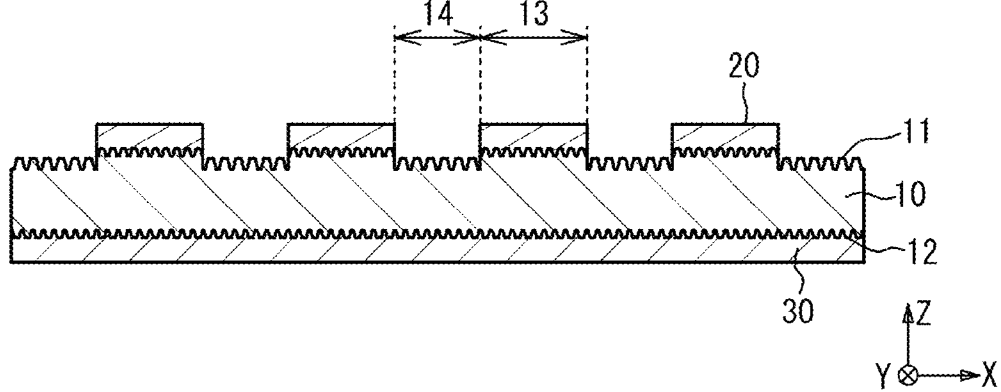
FIG. 5B is a sectional view taken along a line A-A in FIG. 5A.

(Second Embodiment) FIG. 5A is a plan view illustrating a scale 200 according to a second embodiment, and FIG. 5B is a sectional view taken along the line A-A in FIG. 5A. As illustrated in FIG. 5A and FIG. 5B, in the scale 200, the lower surface 12 of the glass substrate 10 is frosted glass-like and opaque, and has fine irregularities formed therein. For example, the lower surface 12 has approximately the same surface roughness as that of the upper surface 11 in the first region 13. The arithmetic mean roughness Ra of the upper surface 11 and the arithmetic mean roughness Ra of the lower surface 12 in the first region 13 may be, for example, 0.20 μm or more, may be 0.25 μm or more, or may be 0.30 μm or more. The arithmetic mean roughness Ra of the lower surface 12 is, for example, 0.9 to 1.1 times, for example 0.95 to 1.05 times, as the arithmetic mean roughness Ra of the upper surface 11 in the first region 13. The rest of the configuration is the same as the scale 100 of the first embodiment, so a description thereof will be omitted.

[Manufacturing Method] In the scale 200 according to the second embodiment, in FIG. 3B of the first embodiment, both the upper surface 11 and the lower surface 12 of the glass substrate 10 are roughened, and both the upper surface 11 and the lower surface 12 are formed into frosted glass. The roughening treatment of the lower surface 12 is performed by the same method as the roughening treatment of the upper surface 11. In order to reduce the number of manufacturing steps, it is preferable to roughen the upper surface 11 and the lower surface 12 at the same time (in one processing step). As a result, the upper surface 11 and the lower surface 12 have approximately the same surface roughness. Thereafter, the same steps as in FIG. 3C and FIG. 3D of the first embodiment are performed.

In the second embodiment, as in the first embodiment, the glass substrate 10 has a frosted glass-like upper surface 11. Therefore, even when the conductor pattern 20 is formed on the upper surface 11 of the glass substrate 10 by laser processing using the laser beam 70, the conductor film 30 provided on the lower surface 12 of the glass substrate 10 is less likely to be damaged.

Furthermore, in the second embodiment, the lower surface 12 of the glass substrate 10 also has a frosted glass shape. As a result, the laser beam 70 is likely to be diffusely reflected also on the lower surface 12, making it difficult for the conductor film 30 provided on the lower surface 12 to be damaged. Furthermore, since the surface roughness of the lower surface 12 is large, the bonding area between the lower surface 12 and the conductor film 30 becomes large, so that the bonding strength of the conductor film 30 is improved.

Figure 6A:
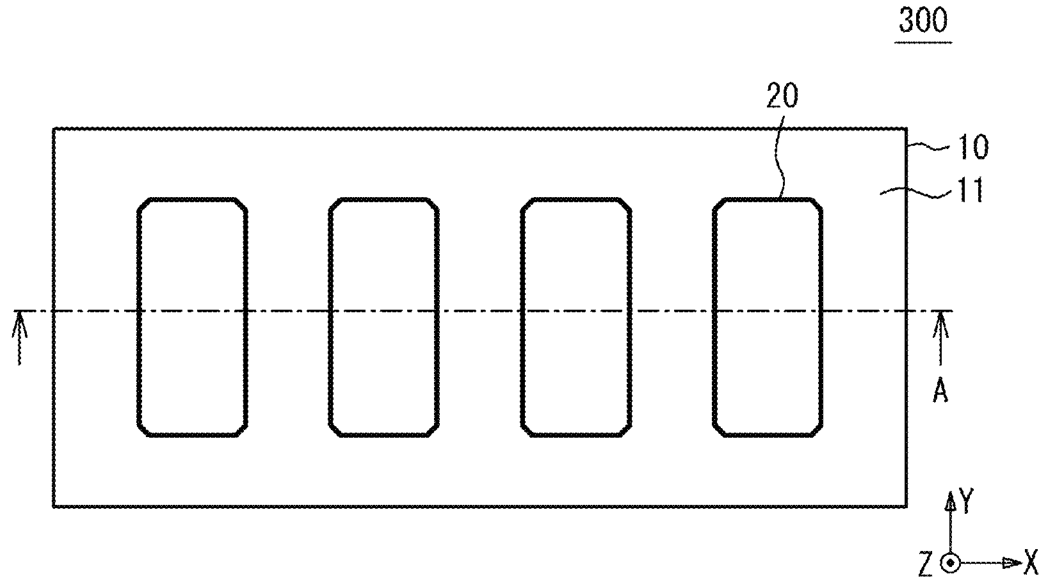
FIG. 6A is a plan view illustrating a scale according to a third embodiment.
Figure 6B:
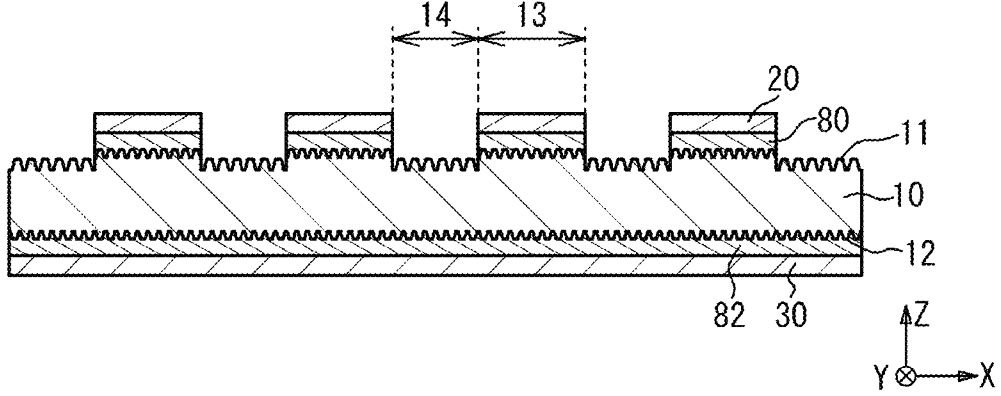
FIG. 6B is a sectional view taken along a line A-A in FIG. 6A.

(Third Embodiment) FIG. 6A is a plan view illustrating a scale 300 according to a third embodiment. FIG. 6B is a sectional view taken along a line A-A in FIG. 6A. As illustrated in FIG. 6A and FIG. 6B, in the scale 300, the lower surface 12 of the glass substrate 10 is also frosted glass, as in the second embodiment. A resin film 80 is provided between the upper surface 11 of the glass substrate 10 and the conductor pattern 20, and a resin film 82 is provided between the lower surface 12 and the conductor film 30. For example, the resin film 80 may function as an adhesive layer that adheres the glass substrate 10 and the conductor pattern 20, and the resin film 82 may function as an adhesive layer that adheres the glass substrate 10 and the conductor film 30. The resin films 80 and 82 are made of, for example, epoxy resin, acrylic resin, vinyl acetate resin, or the like. The rest of the configuration is the same as the scale 100 of the first embodiment, so a description thereof will be omitted.

Figures 7A, 7B, 7C, 7D:
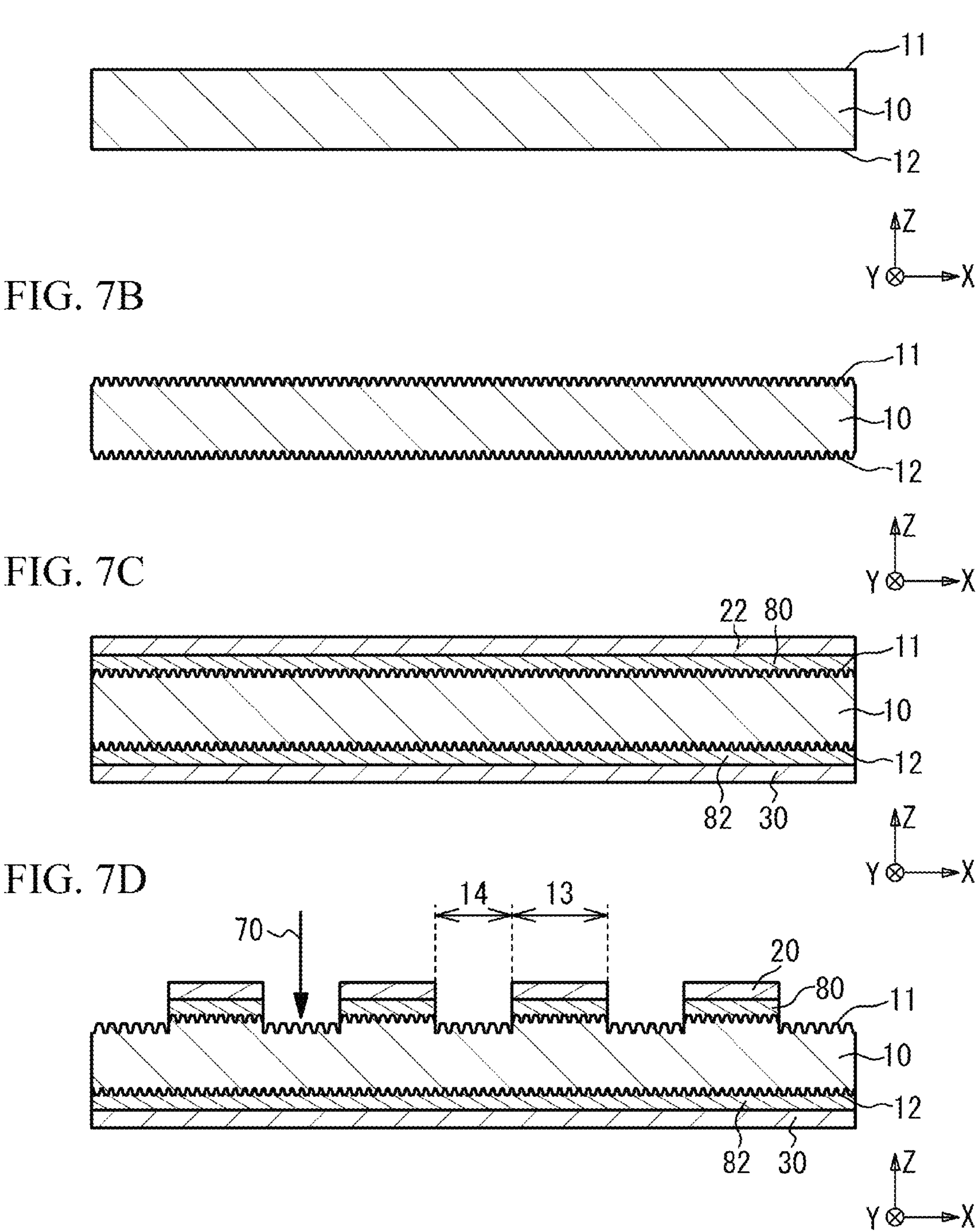
FIG. 7A to FIG. 7D are cross-sectional views illustrating a scale manufacturing method according to a third embodiment.

[Manufacturing Method] FIG. 7A to FIG. 7D are cross-sectional views illustrating a method for manufacturing the scale 300 according to the third embodiment. As illustrated in FIG. 7A, first, the glass substrate 10 is prepared. At this stage, both the upper surface 11 and the lower surface 12 of the glass substrate 10 are smooth surfaces.

As illustrated in FIG. 7B, as in the second embodiment, both the upper surface 11 and the lower surface 12 of the glass substrate 10 are roughened, so that both the upper surface 11 and the lower surface 12 are frosted.

As illustrated in FIG. 7C, a metal foil is attached to the upper surface 11 of the glass substrate 10 using the resin film 80 as an adhesive layer, and the conductor film 22 is formed on the upper surface 11. Similarly, a metal foil is attached to the lower surface 12 of the glass substrate 10 using the resin film 82 as an adhesive layer to form the conductor film 30 on the lower surface 12. The metal foil may be attached using a laminating method or a press working method. The resin film 80 may be formed on the upper surface 11 of the glass substrate 10 by applying a resin or pasting a sheet-like resin film. Alternatively, a metal foil coated with the resin film 80 may be attached to the upper surface 11 of the glass substrate 10. The same applies to the resin film 82.

As illustrated in FIG. 7D, the conductor film 22 and the resin film 80 are patterned by laser processing using the laser beam 70 to form the plurality of conductor patterns 20. Laser processing is performed by the method described in the first embodiment. Since the upper surface 11 of the glass substrate 10 is frosted, similar to the first embodiment, damage to the resin film 82 and the conductor film 30 provided on the lower surface 12 is suppressed.

Figure 8A:
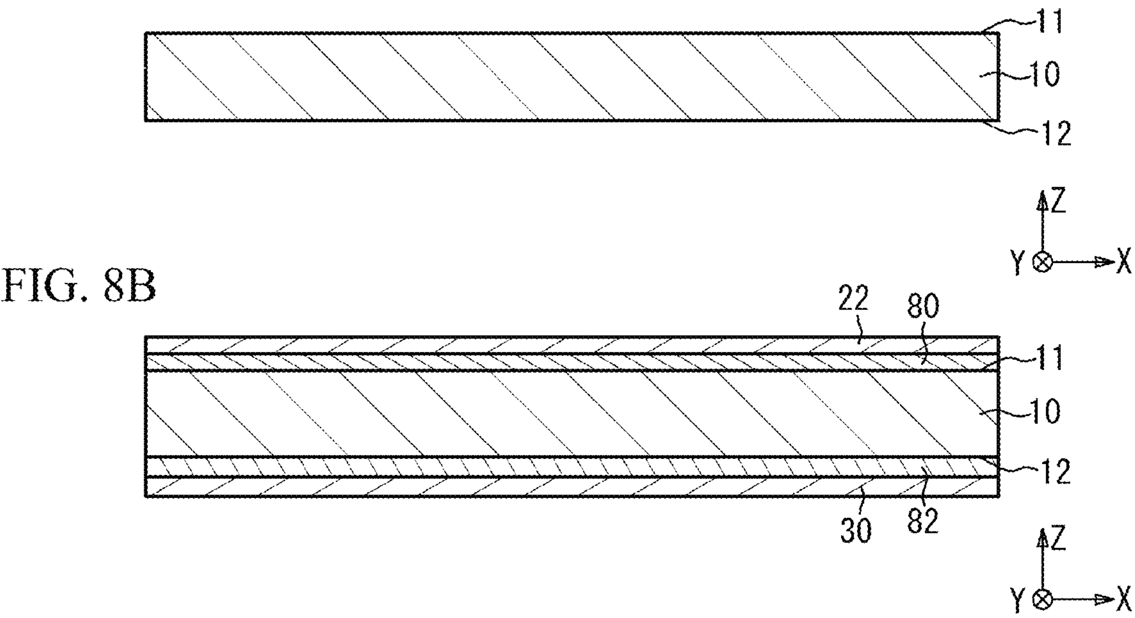
Figure 8A:
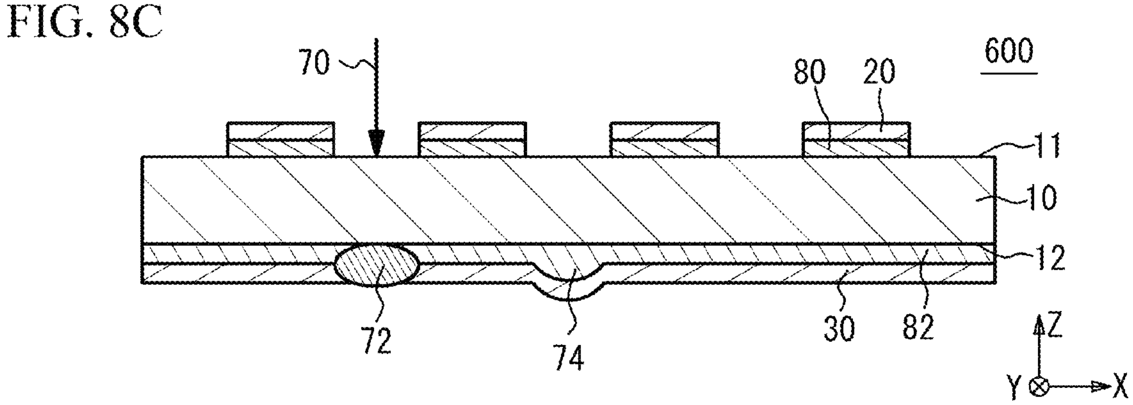

[Comparative Example 2] FIG. 8A to FIG. 8C are cross-sectional views illustrating a method for manufacturing a scale 600 according to a comparative example 2. As illustrated in FIG. 8A, the glass substrate 10 is prepared. Both the upper surface 11 and the lower surface 12 of the glass substrate 10 are smooth surfaces.

As illustrated in FIG. 8B, a metal foil is attached to the upper surface 11 of the glass substrate 10 using the resin film 80 as an adhesive layer, and the conductor film 22 is formed on the upper surface 11. A metal foil is attached to the lower surface 12 of the glass substrate 10 using the resin film 82 as an adhesive layer, and the conductor film 30 is formed on the lower surface 12.

As illustrated in FIG. 8C, the conductor film 22 and the resin film 80 are patterned by laser processing using the laser beam 70 to form the plurality of conductor patterns 20. Since the upper surface 11 of the glass substrate 10 is not roughened and has not become frosted glass, similar to Comparative Example 1, the laser beam 70 transmitted from the upper surface 11 to the lower surface 12 of the glass substrate 10 causes the burnt spots 72 may occur on the resin film 82 and conductor film 30. Further, a bulge 74 may occur in the resin film 82. In this case, as in the comparative example 1, the patterning of the conductor film 22 and the resin film 80 may not be performed normally, or the scale 600 may be placed on the encoder device at an angle, making it impossible to use the scale 600 as a scale.

On the other hand, in the third embodiment, the glass substrate 10 has the frosted glass-like upper surface 11. Therefore, even if the conductor pattern 20 is formed on the upper surface 11 of the glass substrate 10 by laser processing using the laser beam 70, as in the first embodiment, the influence of the laser beam 70 on the resin film 82 and the conductor film 30 formed on the lower surface 12 can be suppressed, and the resin film 82 and the conductor film 30 can be made less likely to be damaged.

Furthermore, in the third embodiment, the resin film 82 is provided between the lower surface 12 of the glass substrate 10 and the conductor film 30 (formed product). In this case, as explained in Comparative Example 2, if the upper surface 11 of the glass substrate 10 is not frosted glass-like, the laser beam 70 may cause the bulge 74 in the resin film 82, making it impossible to use the scale as a scale. Therefore, when the resin film 82 is provided, it is preferable to make the upper surface 11 of the glass substrate 10 into a frosted glass shape to suppress the influence of the laser beam 70 on the resin film 82.

Figure 9A:
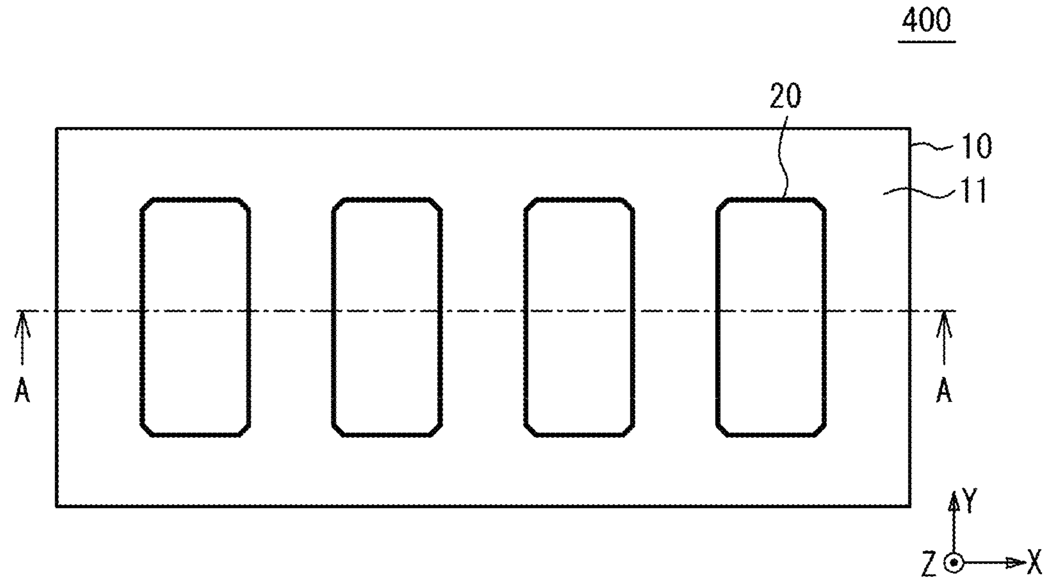
FIG. 9A is a plan view illustrating a scale according to a fourth embodiment.
Figure 9B:
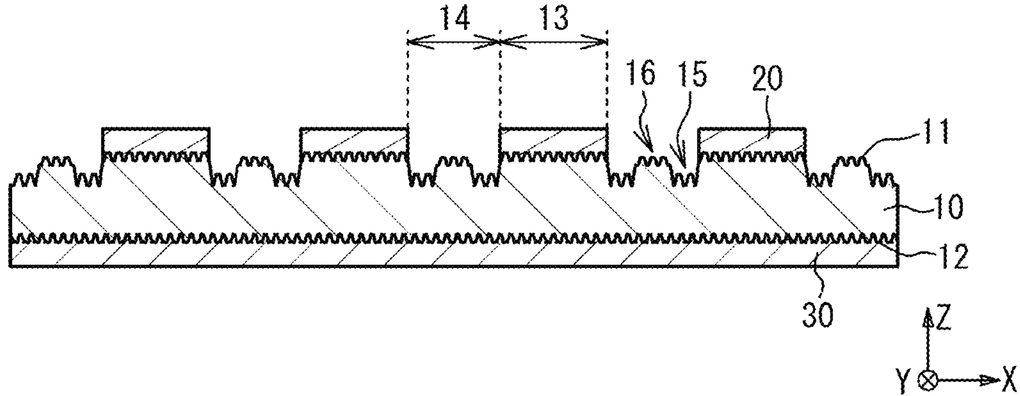
FIG. 9B is a sectional view taken along a line A-A in FIG. 9A.

(Fourth Embodiment) FIG. 9A is a plan view illustrating a scale 400 according to a fourth embodiment, and FIG. 9B is a sectional view taken along the line A-A in FIG. 9A. As illustrated in FIG. 9A and FIG. 9B, in the scale 400, the lower surface 12 of the glass substrate 10 is also frosted glass, as in the second embodiment. In the first to third embodiments, on the upper surface 11 of the glass substrate 10, the entire second region 14 is recessed to the same extent with respect to the first region 13, but in the fourth embodiment, in the second region 14, an adjacent portion 15 adjacent to the first region 13 is recessed deeper than a central portion 16 located at the center in the X-axis direction. For example, the adjacent portion 15 may be recessed by 5 μm or more with respect to the central portion 16, or may be recessed by 10 μm or more. The adjacent portion 15 may be a groove with a V-shaped cross section. The central portion 16 may be slightly recessed with respect to the first region 13, or may not be recessed with respect to the first region 13 and may have the same height as the first region 13. Furthermore, the adjacent portion 15 may have a larger surface roughness than the first region 13. The surface roughness of the central portion 16 may be approximately the same as the surface roughness of the first region 13, or may be greater. The adjacent portion 15 and the central portion 16 may be colored black as in the first embodiment. The rest of the configuration is the same as the scale 100 of the first embodiment, so a description thereof will be omitted.

Figures 10A, 10B, 10C, 10D:
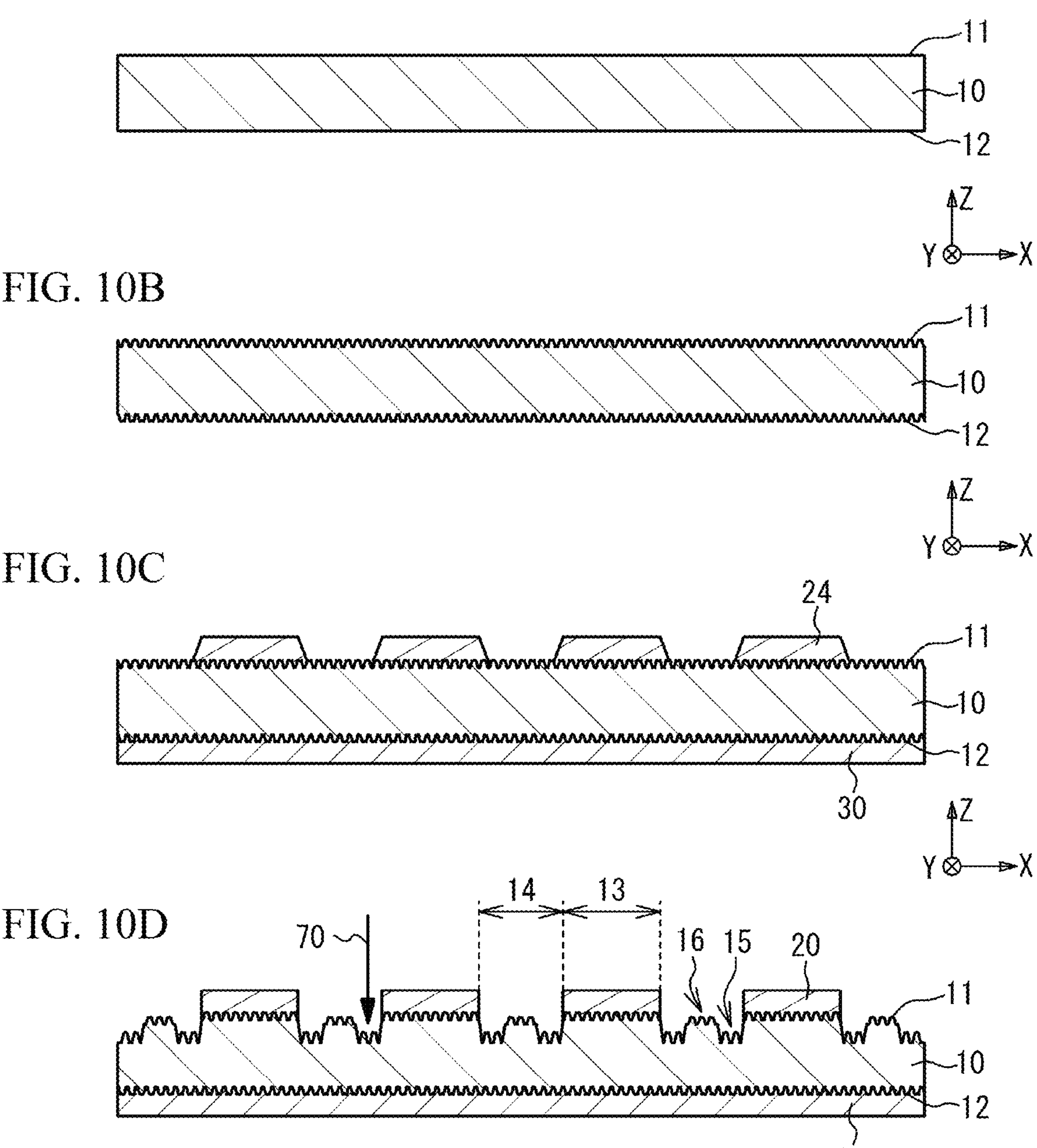
FIG. 10A to FIG. 10D are cross-sectional views illustrating a method for manufacturing a scale according to a fourth embodiment.

[Manufacturing Method] FIG. 10A to FIG. 10D are cross-sectional views illustrating a method for manufacturing the scale 400 according to the fourth embodiment. First, as illustrated in FIG. 10A and FIG. 10B, the same steps as those illustrated in FIG. 7A and FIG. 7B of the third embodiment are performed.

As illustrated in FIG. 10C, a plurality of temporary conductor patterns 24 are formed on the upper surface 11 of the glass substrate 10 by applying a conductor paste to the upper surface 11 using screen printing or the like. By applying a conductor paste to the lower surface 12 of the glass substrate 10, the conductor film 30 is formed on the lower surface 12. Since the upper surface 11 is roughened and has a frosted glass shape, defects such as elongation and/or scratching of the conductor paste in the squeegee feeding direction are suppressed.

When the temporary conductor pattern 24 is formed by applying a conductor paste, the side surface of the temporary conductor pattern 24 may have a tapered shape with a gentle angle. Therefore, as illustrated in FIG. 10D, the edge portion of the temporary conductor pattern 24 is laser-processed using the laser beam 70 to form the conductor pattern 20 having a steeply angled side surface. Since the upper surface 11 of the glass substrate 10 irradiated with the laser beam 70 is etched, the adjacent portion 15 of the second region 14 adjacent to the first region 13 is recessed with respect to the first region 13. Further, the adjacent portion 15 may have a surface roughness greater than that of the first region 13, or may be a groove having a V-shaped cross section. The central portion 16 of the second region 14 located at the center in the X-axis direction may be irradiated with the laser beam 70 for a short time and be slightly recessed with respect to the first region 13, or may be hardly irradiated with the laser beam 70 and the height remains approximately the same as that of the first region 13 without being recessed relative to the first region 13. When the laser beam 70 is irradiated for only a short time, the surface roughness of the central portion 16 may be larger than that of the first region 13, and when the laser beam 70 is hardly irradiated, the surface roughness of the central portion 16 remains at the same level as the surface roughness of the first region 13.

In the fourth embodiment as well, the glass substrate 10 has a frosted glass-like upper surface 11, as in the first embodiment. Therefore, even when the conductor pattern 20 is formed by irradiating the edge portion of the temporary conductor pattern 24 with the laser beam 70 and processing the edge portion of the temporary conductor pattern 24, the effect of the laser beam 70 on the conductor film 30 formed on the lower surface 12 can be suppressed, and the conductor film 30 can be made less likely to be damaged.

Furthermore, in the fourth embodiment, the conductor pattern 20 is formed by laser processing the edge portion of the temporary conductor pattern 24. Therefore, on the upper surface 11 of the glass substrate 10, the second region 14 has the adjacent portion 15 adjacent to the first region 13 recessed with respect to the first region 13, and is deeper than the conductor pattern 20 at the boundary with the first region 13. As a result, it is possible to prevent the lower end portion from remaining in a tapered shape on the side surface of the conductor pattern 20, and it is possible to prevent the current flowing through the conductor pattern 20 from being disturbed.

(Experiment Examples) FIG. 11A to FIG. 11D are examples of optical microscope images of the upper surface 11 of the glass substrate 10 in samples A to D. In sample A illustrated in FIG. 11A, the upper surface 11 and the lower surface 12 of the glass substrate 10 are not subjected to roughening treatment, and the upper surface 11 and the lower surface 12 are smooth surfaces. The glass substrate 10 is made of soda lime glass (the same applies to the glass substrates 10 of samples B to D). The arithmetic mean roughness Ra and maximum height Rz of the upper surface 11 and the lower surface 12 were 0.00±0.00 μm. Further, when red light was perpendicularly incident on the upper surface 11 of the glass substrate 10, the transmittance of the red light from the upper surface 11 to the lower surface 12 was 93%.

Figures 11A, 11B, 11C, 11D:
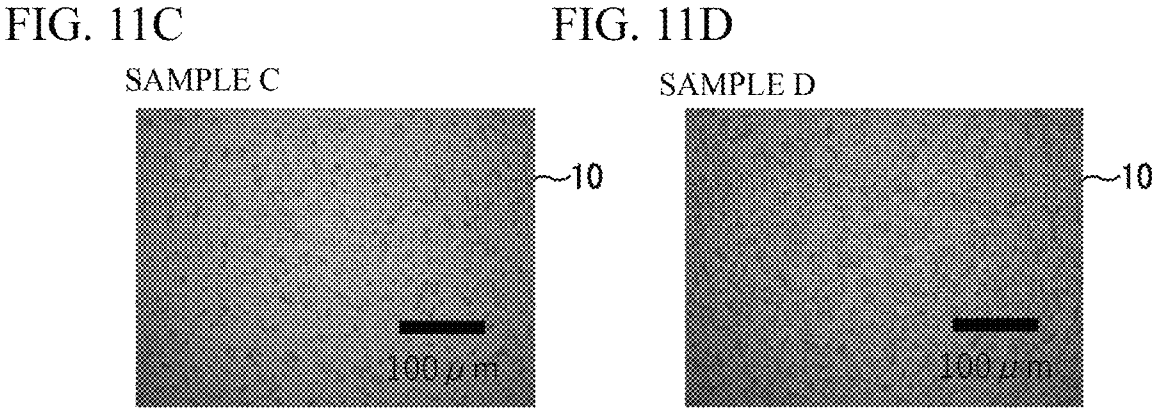
FIG. 11A to FIG. 11D are examples of images taken by an optical microscope of an upper surface of a glass substrate in samples A to D.

In sample B illustrated in FIG. 11B, the upper surface 11 and the lower surface 12 of the glass substrate 10 were roughened to have a frosted glass-like appearance. The arithmetic mean roughness Ra of the upper surface 11 and the lower surface 12 was 0.05±0.02 μm, and the maximum height Rz was 0.48±0.17 μm. Further, when red light was perpendicularly incident on the upper surface 11 of the glass substrate 10, the transmittance of the red light from the upper surface 11 to the lower surface 12 was 88%.

In sample C illustrated in FIG. 11C, the upper surface 11 and the lower surface 12 of the glass substrate 10 were subjected to a roughening treatment to make the upper surface 11 and the lower surface 12 frosted. The arithmetic mean roughness Ra of the upper surface 11 and the lower surface 12 was 0.30±0.14 μm, and the maximum height Rz was 1.43±0.36 μm. Further, when red light was perpendicularly incident on the upper surface 11 of the glass substrate 10, the transmittance of the red light from the upper surface 11 to the lower surface 12 was 87%.

In sample D illustrated in FIG. 11D, the upper surface 11 and the lower surface 12 of the glass substrate 10 were subjected to a roughening treatment to make the upper surface 11 and the lower surface 12 frosted. The arithmetic mean roughness Ra of the upper surface 11 and the lower surface 12 was 0.72±0.08 μm, and the maximum height Rz was 2.10±0.47 μm. Further, when red light was perpendicularly incident on the upper surface 11 of the glass substrate 10, the transmittance of the red light from the upper surface 11 to the lower surface 12 was 86%.

Figure 12A:
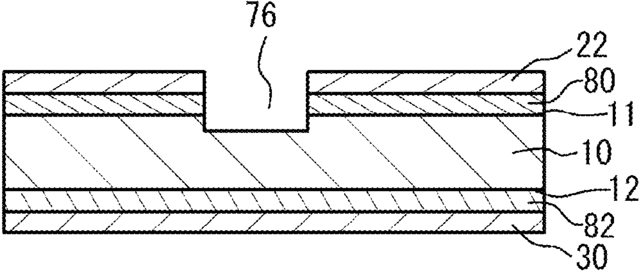
FIG. 12A and FIG. 12B are cross-sectional views of devices fabricated using glass substrates of samples A to D.
Figure 12B:
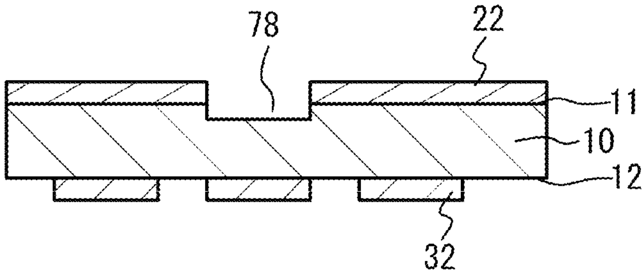
Figure 13A:
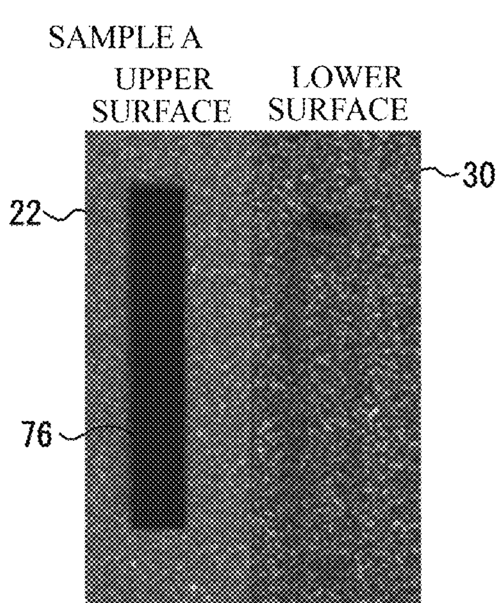
FIG. 13A to FIG. 13D are examples of optical microscope images of an upper surface and a lower surface of device A manufactured using glass substrates of samples A to D.
Figure 13B:
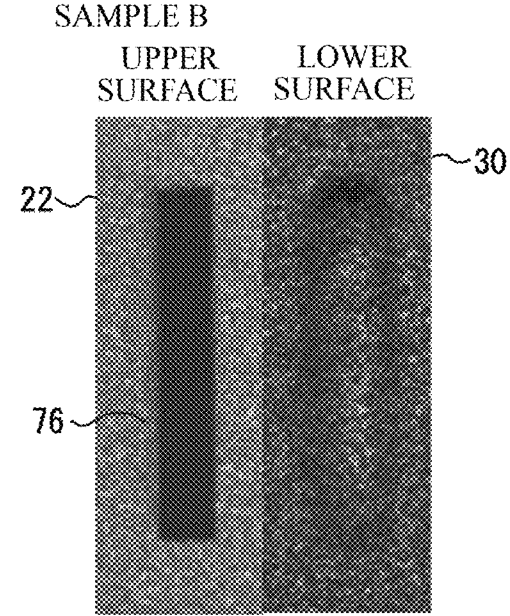
Figure 13C:
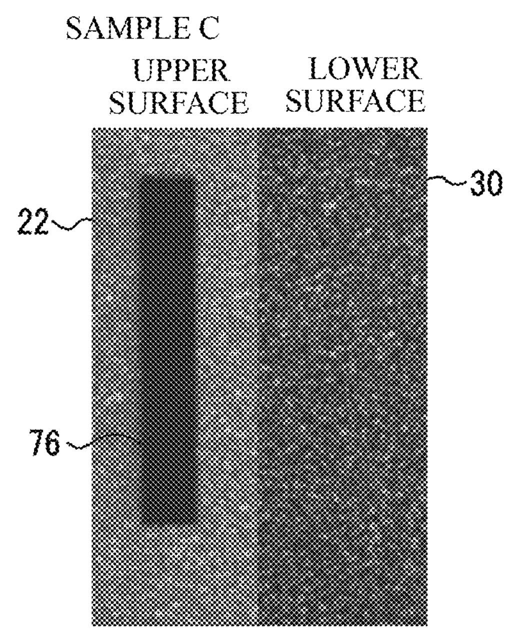
Figure 13D:
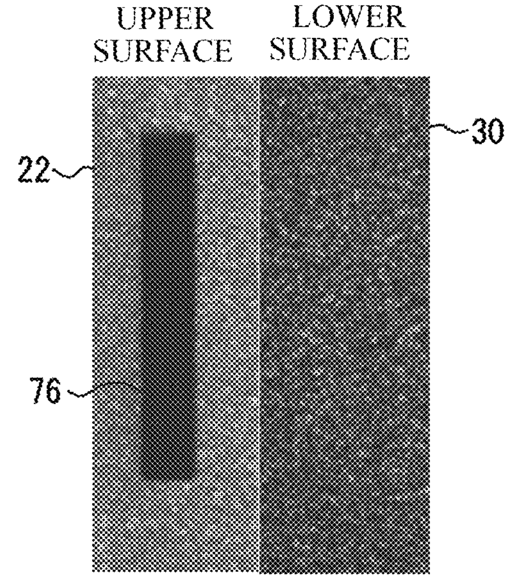

Devices A and B illustrated in FIG. 12A and FIG. 12B were fabricated using the glass substrates 10 of samples A to D. In device A illustrated in FIG. 12A, the conductor film 22 is formed on the upper surface 11 of the glass substrate 10 with the resin film 80 interposed therebetween. The conductor film 30 is formed on the lower surface 12 of the glass substrate 10 with the resin film 82 interposed therebetween. A recess 76 is formed in the upper surface 11 of the glass substrate 10, penetrates the conductor film 22 and the resin film 80, and digs into a part of the glass substrate 10. The recess 76 was formed by laser processing using green laser light. For laser processing, pulsed laser processing with a pulse width of about 20 ps and a power of about 10 W was used. The conductor films 22 and 30 are made of copper. The thickness of the glass substrate 10 is 1.1 mm, the thickness of the resin films 80 and 82 is 20 μm, and the thickness of the conductor films 22 and 30 is 12 μm. The recess 76 has a width of 250 μm and a depth of 35 μm.

In device B illustrated in FIG. 12B, the conductor film 22 is formed on the upper surface 11 of the glass substrate 10. A conductor pattern 32 is formed on the lower surface 12 of the glass substrate 10. A recess 78 is formed in the upper surface 11 of the glass substrate 10, penetrates the conductor film 22 and digs into a part of the glass substrate 10. The recess 78 was formed by laser processing using green laser light. For laser processing, pulsed laser processing with a pulse width of about 20 ps and a power of about 10 W was used. The conductor film 22 and the conductor pattern 32 are made of silver. The thickness of the glass substrate 10 is 1.1 mm, and the thickness of the conductor film 22 and the conductor pattern 32 is 12 μm. The width of the recess 78 is 250 μm and the depth is 50 μm.

FIG. 13A to FIG. 13D are examples of optical microscope images of the upper and lower surfaces of device A manufactured using the glass substrates 10 of samples A to D. As illustrated in FIG. 13A to FIG. 13D, it was confirmed that in samples A and B, the conductor film 30 was damaged on the lower surface of device A, but in samples C and D, damage to the conductor film 30 was suppressed.

Figures 14A, 14B:
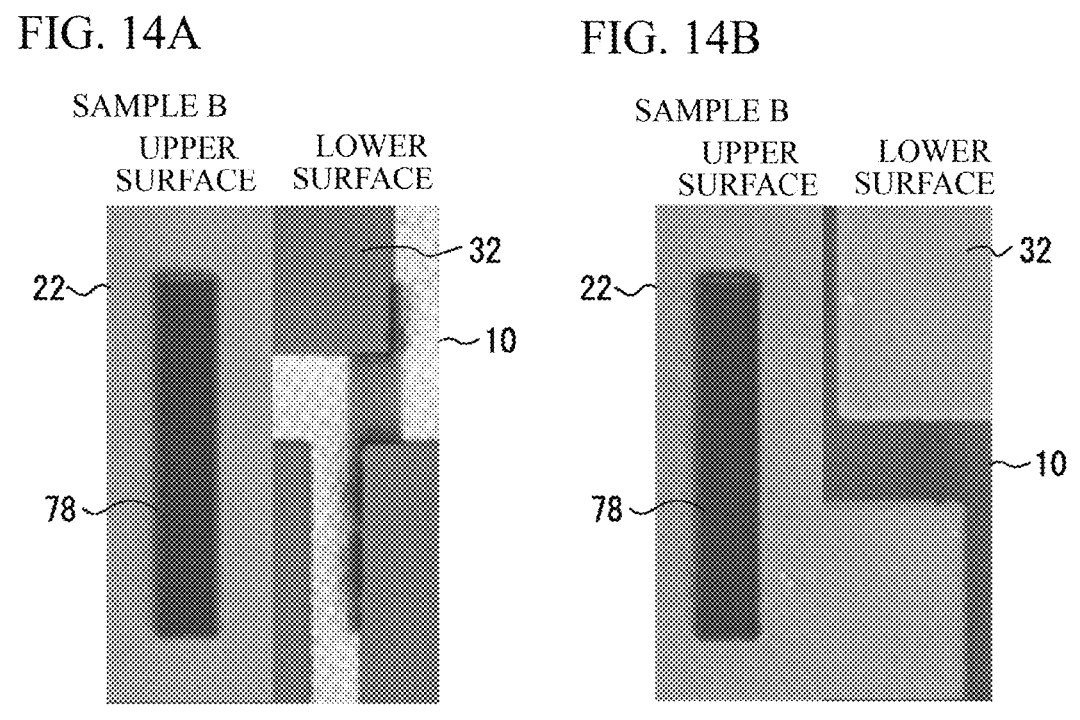

FIG. 14A and FIG. 14B are examples of optical microscope images of the upper and lower surfaces of device B manufactured using the glass substrates 10 of samples A and D. As illustrated in FIG. 14A and FIG. 14B, it was confirmed that in sample A, the conductor pattern 32 was damaged on the lower surface of device A, but in sample D, damage to the conductor pattern 32 was suppressed.

As illustrated in FIG. 13A to FIG. 14B, under the illustrated laser processing conditions, by setting the transmittance of red light from the upper surface 11 to the lower surface 12 of the glass substrate 10 to 87% or less, it has been confirmed that when the conductor film 22 is processed using the laser processing, damage to the conductor film 30 or the conductor pattern 32 provided on the lower surface 12 can be suppressed. In addition, when the upper surface 11 and the lower surface 12 are made into frosted glass by roughening treatment, it has been confirmed that the transmittance of red light transmitted from the upper surface 11 to the lower surface 12 can be reduced to 87% or less by setting the arithmetic mean roughness Ra of the upper surface 11 and the lower surface 12 to 0.16 μm or more. At this time, it was confirmed that the maximum height Rz of the upper surface 11 and the lower surface 12 was 1.07 μm or more. Note that by using different laser processing conditions in terms of parameters such as the wavelength, power, and pulse density of the laser beam, the conductor film 30 or the like may be damaged unless the transmittance and degree of roughening of the glass substrate 10 are further increased. On the other hand, there are cases in which the conductor film 30 or the like are not damaged even if the size is small.

Note that in the above embodiment, an example is shown in which the solid conductor film 30 is provided as a formation provided on the lower surface 12 of the glass substrate 10, but the present invention is not limited to this case. The formation provided on the lower surface 12 may be a solid film other than a conductor film, a patterned film, or an element constituting a circuit such as a sensor element.

Note that in the above embodiment, the case of the electromagnetic induction encoder 1000 is illustrated as an example, but other cases such as a photoelectric encoder may also be used. Further, although the scale used in a linear encoder is illustrated as an example, the scale may be a scale used in a rotary encoder, or a scale used in other 5 encoders or sensors such as an arcuate encoder.

Although FIG. 1A illustrates an example in which the electromagnetic induction encoder 1000 includes the scale 100 of the first embodiment, the electromagnetic induction encoder 1000 may also include the scales of the second to fourth embodiments.

The present invention is not limited to the specifically disclosed embodiments or examples and variations but may include other embodiments or examples and variations without departing from the scope of the present invention.

What is claimed is:

1. A scale comprising:

a glass substrate having a frosted glass-like upper surface;

a plurality of conductor patterns arranged at predetermined intervals on the frosted glass-like upper surface of the glass substrate; and a formation provided on a lower surface of the glass substrate.

2. The scale as claimed in claim 1, wherein the upper surface of the glass substrate has a first region provided with the plurality of conductor patterns, and a second region located between the plurality of conductor patterns, wherein at least a portion of the second region adjacent to the first region is recessed with respect to the first region, and wherein the second region is formed deeper than the plurality of conductor patterns at a boundary with the first region.

3. The scale as claimed in claim 2, wherein a bottom surface of at least a portion of the second region adjacent to the first region has a surface roughness greater than that of the first region.

4. The scale as claimed in claim 1, wherein the lower surface of the glass substrate is frosted glass-like.

5. The scale as claimed in claim 1 further comprising:

a resin film provided between the lower surface of the glass substrate and the formation, wherein the formation is a conductor film.

6. An encoder comprising:

a scale as claimed in claim 1.

7. The scale as claimed in claim 1, wherein the formation is provided on a side opposite to an interval between two of the plurality of conductor patterns, with the glass substrate interposed between the interval and the formation.

8. A manufacturing method of a scale comprising:

roughening an upper surface of a glass substrate into a frosted glass state;

forming a formation on a lower surface of the glass substrate; and after roughening the upper surface of the glass substrate into the frosted glass state and forming the formation, forming a plurality of conductor patterns arranged at predetermined intervals on the frosted glass state upper surface of the glass substrate by laser processing.

9. The method as claimed in claim 8, further comprising:

after roughening the upper surface of the glass substrate into the frosted glass state, forming a conductor film on the upper surface of the glass substrate, wherein, in the forming of the plurality of conductor patterns, the plurality of conductor patterns are formed by patterning the conductor film by a laser processing.

10. The method as claimed in claim 8, further comprising:

after roughening the upper surface of the glass substrate into the frosted glass state, forming a plurality of temporary conductor patterns on the upper surface of the glass substrate, wherein, in the forming of the plurality of conductor patterns, the plurality of conductor patterns are formed by processing edge portions of the plurality of temporary conductor patterns by a laser processing.

11. The method as claimed in claim 8, wherein the frosted glass state is provided between the plurality of conductor patterns and the glass substrate, and between the plurality of conductor patterns.

12. The method as claimed in claim 8, wherein the formation is provided on a side opposite to an interval between two of the plurality of conductor patterns, with the glass substrate interposed between the interval and the formation.

13. A scale comprising:

a glass substrate having a frosted glass-like upper surface;

a plurality of conductor patterns arranged at predetermined intervals on the upper surface of the glass substrate; and a formation provided on a lower surface of the glass substrate wherein the upper surface of the glass substrate under the plurality of conductor patterns and between adjacent conductor patterns is in a frosted glass state.

14. The scale as claimed in claim 13, wherein the upper surface of the glass substrate has a first region provided with the plurality of conductor patterns, and a second region located between the plurality of conductor patterns, wherein at least a portion of the second region adjacent to the first region is recessed with respect to the first region, and wherein the second region is formed deeper than the plurality of conductor patterns at a boundary with the first region.

15. The scale as claimed in claim 14, wherein a bottom surface of at least a portion of the second region adjacent to the first region has a surface roughness greater than that of the first region.

16. The scale as claimed in claim 13, wherein the lower surface of the glass substrate is frosted glass-like.

17. The scale as claimed in claim 13 further comprising:

a resin film provided between the lower surface of the glass substrate and the formation, wherein the formation is a conductor film.

18. An encoder comprising:

a scale as claimed in claim 13.

* * * * *